W. W. RHODES.
MEASURING TANK.
APPLICATION FILED MAR. 13, 1914.
1,124,329.
Patented Jan. 12, 1915.
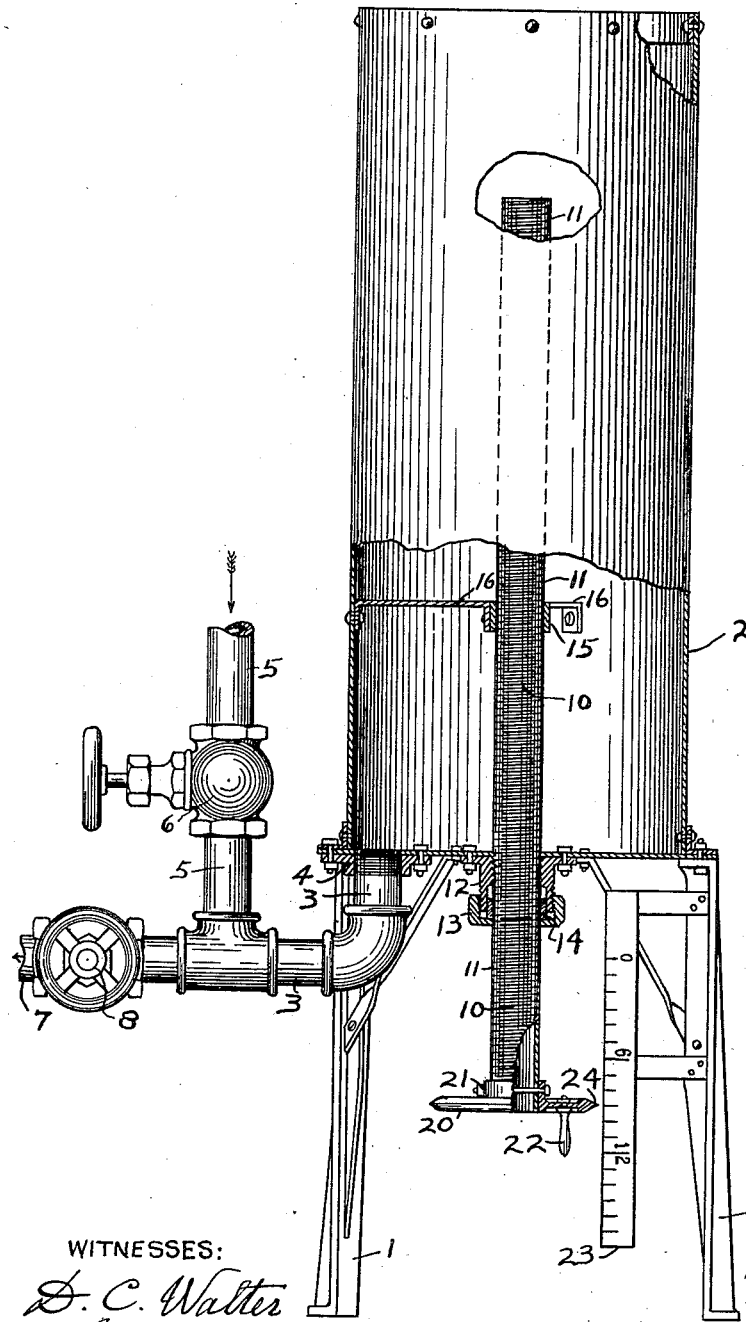
WITNESSES:
D. C. Walter
R. Y. Allen
INVENTOR.
William Warren Rhodes
by
Owen, Owen & Crampton

UNITED STATES PATENT OFFICE.

WILLIAM WARREN RHODES, OF WOODVILLE, OHIO.

MEASURING-TANK.

1,124,329.

Specification of Letters Patent.

Patented Jan. 12, 1915.

Application filed March 13, 1914. Serial No. 824,501.

*To all whom it may concern:*

Be it known that I, WILLIAM W. RHODES, a citizen of the United States, and a resident of Woodville, in the county of Sandusky and State of Ohio, have invented a certain new and useful Measuring-Tank; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to liquid measuring tanks.

It particularly relates to graduated overflow tanks.

It has for its object to provide a means for measuring liquid quantities.

It particularly has for its object to provide a means which will limit the volume of liquid containable in a receiver or tank, to any desired amount, the excess being caused to flow from the tank.

In the use of constructions containing my invention, the liquid may be poured into or directed through pipes into the container and when the tank is filled to the desired amount the excess of the liquid poured into or directed into the tank will over-flow. Once the device is adjusted, liquids may be freely poured into the container without regard to the amount poured or directed into the container. The device therefore is usable by unskilled laborers. When the adjustable element has been set for the desired amount, no attention is required as to the amount of the liquid that is poured into the tank.

The invention is of special advantage where measured amounts of water are to be used in the conduct of a process of any nature. The water may be directed into the tank and when the attention of the operator is called to the over-flow by seeing it or hearing it, the inlet of the water may be closed off. Such an apparatus is particularly usable in connection with the process of slaking lime where varying amounts of water for a given volume of lime are required according to the character of the lime, that is according to the character of the rock of which it is formed and according to the character of the roast to which the rock is subjected in the production of the lime.

A suitable scale or graduation is provided to indicate the adjustment of the variable element of the device. Also suitable inlet and outlet pipes are provided with appropriate valves for opening and closing the pipes.

The invention may be contained in many constructions all of which come within the purview of the claim hereinafter appended. To show the practicability of constructions embodying my invention, I have selected one of such constructions as an example and shall describe it hereinafter. The construction selected is illustrated in the accompanying drawing.

The figure of the drawing illustrates a vertical side view of a construction containing my invention, being shown partly in section.

In the figure, 1 is any suitable standard or base for supporting the container 2. The standard may be made of three or more legs suitably braced and arranged for the support of the container 2. A pipe 3 is threaded to the collar 4 which is bolted to the bottom of the container 2. An inlet pipe 5 having a valve 6 is connected to the pipe 3 and an outlet pipe 7 having a valve 8 is also connected to the pipe 3. Water may be directed into the container 2 by closing valve 8 and opening valve 6. It will then pass through pipes 5 and valve 6 into the container 2. To draw the liquid from the container, the valve 6 is closed and the valve 8 is opened, whereupon the liquid will flow through the pipes 3 and 7.

The container 2 is provided with an adjustable element. This consists of a pipe 10 having thread 11 located on the outside of the pipe and extending over at least a portion thereof. If desired, the entire length of the pipe 10 may be threaded in order to vary the containability of the receptacle 2 within its limits, that is, from the bottom to the top of the container. The pipe 10 threads through a packing box 12 having a suitable packing ring 13, and packing washer or material 14. The packing box 12 is located on the bottom of the container and prevents the escape of liquids around the point of entrance of the pipe 10 into the container.

A suitable guiding collar 15 may be provided at a point remote from the bottom of the container for guiding the pipe 10 and holding it in position within the container. The collar 15 is suitably braced by means of radially extending irons 16. The collar 15 may be threaded if desired.

The lower end of the pipe 10 is provided with a suitable manual means for rotating it. It may consist of the wheel 20 locked or keyed to the end of the pipe 10 by an appropriate means such as by the bolt 21 and operated by means of a handle 22. By this means the pipe may be altered as to its height within the container. The liquids such as water, may be directed into the container 2 whereupon the container will fill to the upper end of the pipe 10 and then the water will flow down through the pipe 10 and into a suitable flushing trough or other suitable pipe or container as may be desired. If the height of the pipe 10, within the container 2, is altered, corresponding amounts of water may be contained in the container 2 and consequently the tank 2 may be used for measuring different amounts of liquid.

To indicate the relative position of the pipe 10 in the container 2, a suitable indicator may be provided. A preferred form of indicator consists of the scale 23 supported on the standard 1 and located in proximity to the wheel 20. A wheel may be provided with an edge 24 which will point or indicate the relation of the pipe to the scale. By rotating the wheel, the pipe will thread through the packing box 12 and the edge 24 always being in proximity to the scale 23, will indicate the lift or depression of the pipe within the container 2. In the use of the apparatus, the pipe 10 may be rotated by using the handle 22 the edge of the wheel 22 indicating the desired change. The valve 6 may then be opened and after the valve 8 is closed, the water, or other liquids may be allowed to freely flow into the pipe. When the water reaches the top of the pipe or after it overflows, the valve 6 may be closed. When it is desired to use the water or liquid within the container 2, the valve 8 may be opened and the container emptied. The container 2 may then be refilled as before.

If the construction is used in connection with the process of slaking lime, the adjustable element may be set according to the character of the lime being slacked for any period of time and then the construction may be freely used by unskilled laborers. When the character of the lime used varies, the height of the pipe 10, within the container, may be correspondingly altered and the construction used as before.

What I claim as new and desire to secure by Letters Patent, is as follows:

The combination of a container, an inlet pipe, and an outlet pipe communicating with the container at the bottom thereof, a threaded packing box located in the bottom of the container, a threaded pipe extending up through the threaded box, a guide collar located centrally along the threaded pipe, a wheel connected to the threaded pipe for rotating the pipe and a linear indicator located transverse the plane of the wheel and parallel to the pipe and in vicinity of the periphery of the wheel.

In testimony whereof, I have hereunto signed my name to this specification in the presence of two subscribing witnesses.

WILLIAM WARREN RHODES.

Witnesses:
   FRANZ W. WEBER,
   JOHN C. ASMUS.